March 14, 1967 E. PORTER 3,308,549
DEVIATION AND DIRECTION GAUGE MEANS
Filed Jan. 25, 1966 4 Sheets-Sheet 1
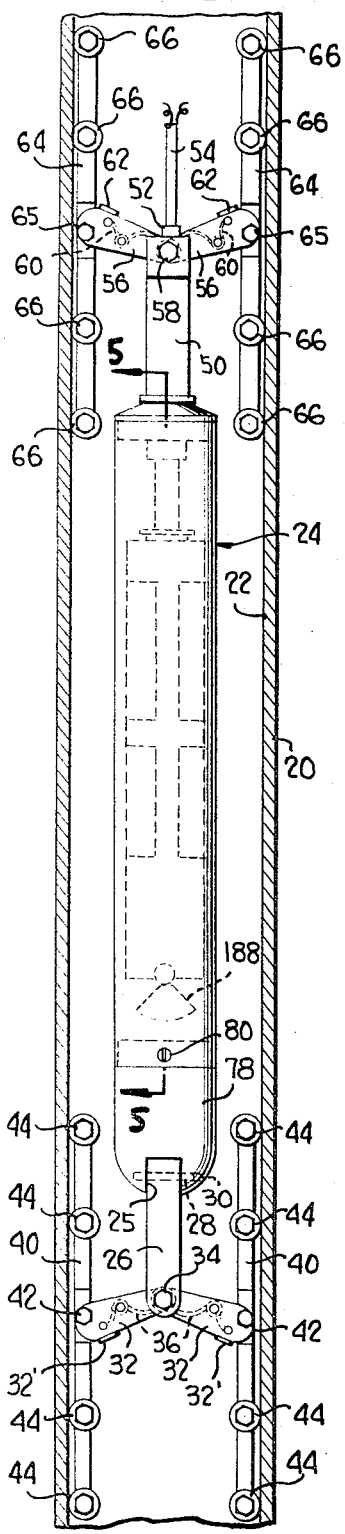
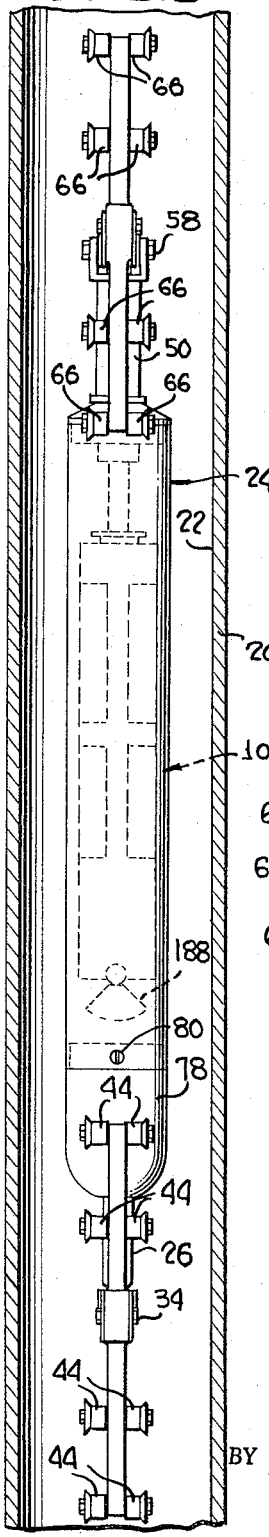
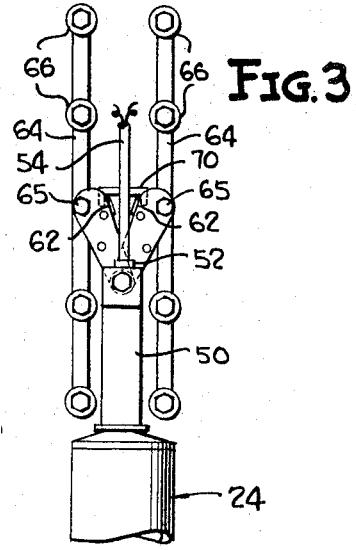
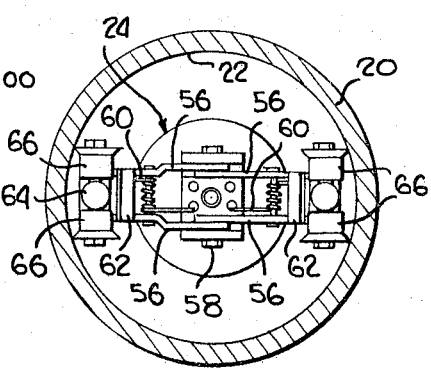
INVENTOR
EDWARD PORTER
BY *Shoemaker and Mattare*
ATTORNEYS March 14, 1967  E. PORTER  3,308,549
DEVIATION AND DIRECTION GAUGE MEANS
Filed Jan. 25, 1966  4 Sheets-Sheet 2
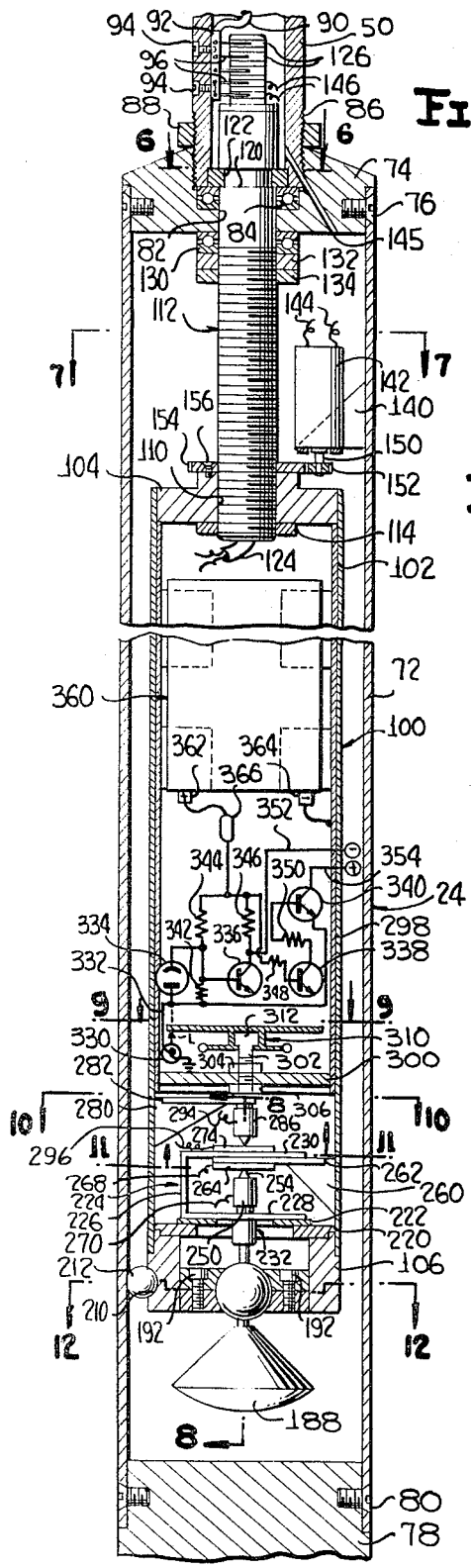
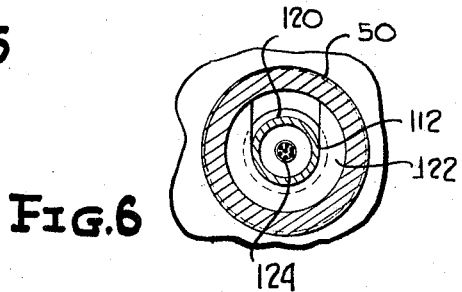
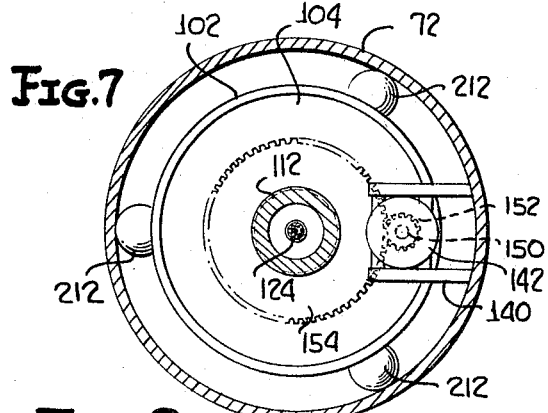
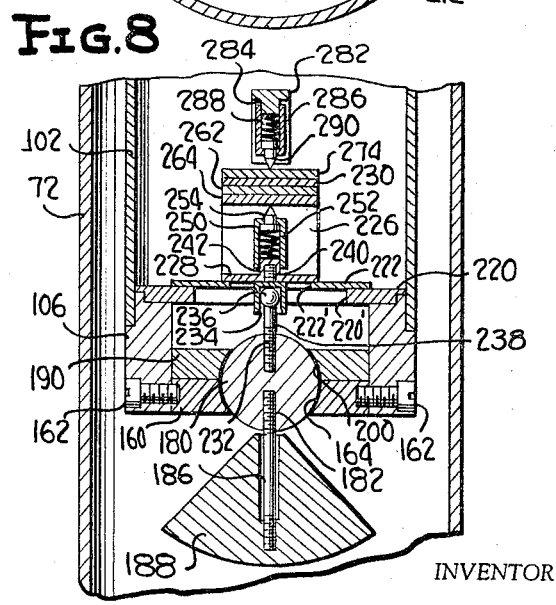
INVENTOR
EDWARD PORTER
BY Shoemaker and Mattare
ATTORNEYS March 14, 1967      E. PORTER      3,308,549
DEVIATION AND DIRECTION GAUGE MEANS
Filed Jan. 25, 1966      4 Sheets-Sheet 3
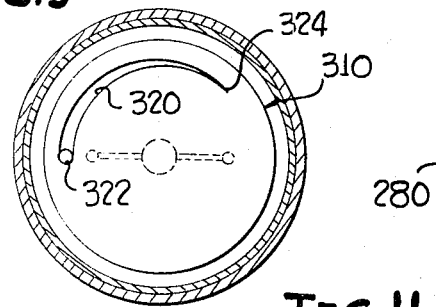
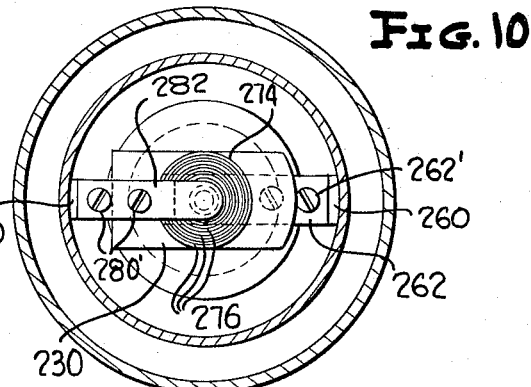
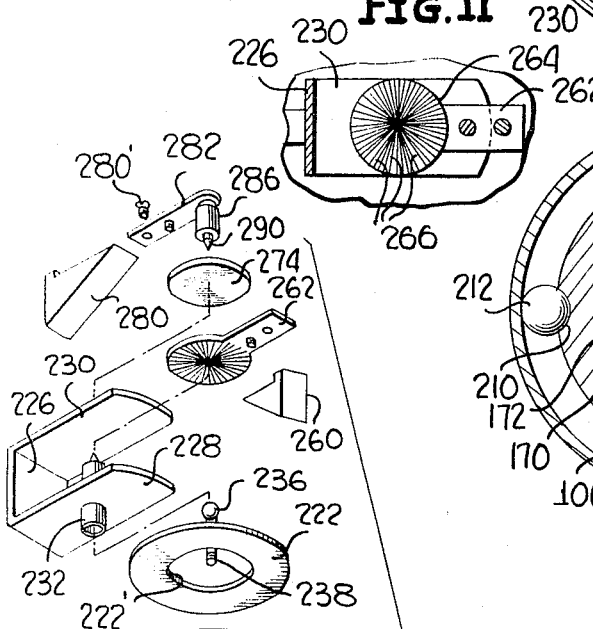
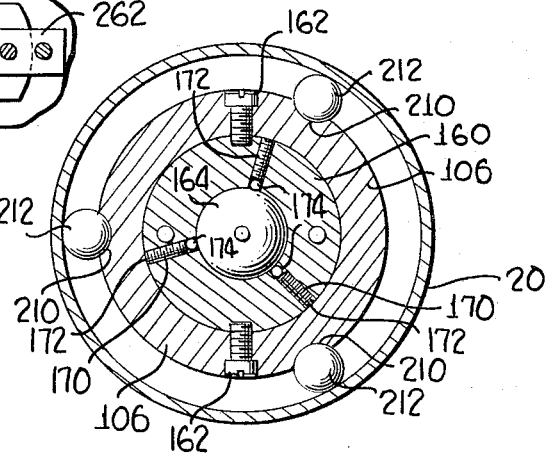
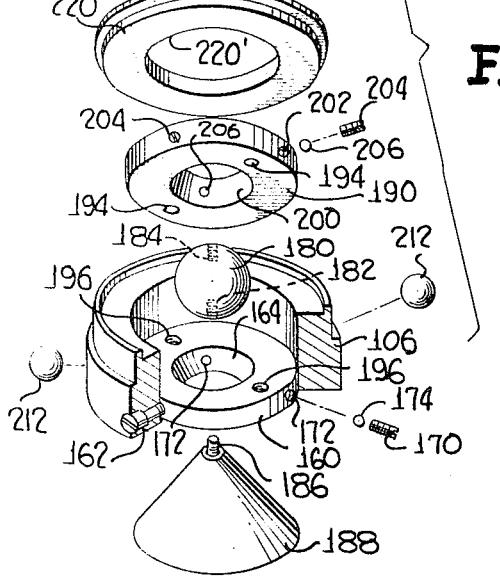
INVENTOR
EDWARD PORTER
BY *Shoemaker and Mattare*
ATTORNEYS March 14, 1967  E. PORTER  3,308,549
DEVIATION AND DIRECTION GAUGE MEANS
Filed Jan. 25, 1966  4 Sheets-Sheet 4

INVENTOR
Edward Porter
BY Shoemaker and Mattare
ATTORNEY

United States Patent Office 3,308,549
Patented Mar. 14, 1967

3,308,549
DEVIATION AND DIRECTION GAUGE MEANS
Edward Porter, Fort Worth, Tex., assignor to Azimuth Gauge Inc., Fort Worth, Tex.
Filed Jan. 25, 1966, Ser. No. 530,758
9 Claims. (Cl. 33—205)

The present application is a continuation-in-part of copending U.S. patent application Ser. No. 360,616, filed Apr. 17, 1964, now abandoned.

The present invention relates to a new and novel deviation and direction gauge means, and more particularly to a gauge means of this nature which is especially adapted for use in bore holes of oil wells and the like.

When drilling bore holes deep beneath the surface of the earth as for example in drilling oil wells, it is necessary to obtain readings from time to time as to the direction in which the bore hole is inclined, as well as the amount of inclination or deviation of the bore hole from a true vertical position. It will of course be evident that the gauge of the present invention may be utilized for measuring the desired characteristics in any type of a bore or hole within which the device can be inserted, and the apparatus will be described as specifically used in a bore hole simply for the purpose of illustration.

It is apparent that in order to apprise an operator of the direction of the bore hole, the apparatus must establish a fixed reference direction and provide readings from its position deep within the hole to the surface which will enable an observer to readily ascertain the exact direction in which the bore hole is directed.

Additionally, it is necessary to provide an accurate measurement of the angle of deviation from vertical which exists in the bore hole.

The present invention provides both a deviation indicating means and a direction indicating means so that the operator is completely informed as to the particular relationship of an area of the bore hole in which the gauge means is disposed.

The apparatus is also preferably provided with an automatic centering means for maintaining the apparatus in a central position within the bore hole, this automatic centering means also incorporating antifriction means which enables the centering means to readily travel over any faults or obstructions in the bore wall.

The apparatus may also be utilized for measuring depth of the bore hole simply by measuring the length of cable employed for lowering the apparatus into the bore hole. Means may also be incorporated in the apparatus for measuring the depth of the liquid as by employing a densitometer and an infrared system may be employed for determining the type of gas or liquid disposed within the bore hole.

The apparatus of the present invention is also particularly designed such that it can be easily installed, removed and operated by a single man, the over-all arrangement being quite compact to enable it to be readily transported to the desired site.

An object of the present invention is to provide a new and novel deviation and direction gauge means which is especially adapted for use in bore holes of oil wells and similar installations.

Another object of the invention is the provision of a deviation and direction gauge means which is adapted to accurately measure the deviation angle from a true vertical position of a particular portion of a bore hole and the like.

A further object of the invention is to provide a deviation and direction gauge means which is adapted to accurately measure and indicate the direction in which the bore extends as related to a fixed reference direction.

Still another object of the invention is the provision of a deviation and direction gauge means including an automatic centering means and which can be easily installed, removed and operated by a single man.

Still another object of the invention is to provide a deviation and direction gauge means which is quite simple, compact and inexpensive in construction, and yet which at the same time is quite efficient and reliable in operation.

Other objects and many attendant advantages of the invention will become more apparent when considered in connection with the specification and accompanying drawings, wherein:

FIG. 1 is a longitudinal section through a bore hole illustrating the apparatus of the present invention in elevation;

FIG. 2 is a side view of the apparatus shown in FIG. 1;

FIG. 3 illustrates the upper end portion of the apparatus shown in FIG. 1 in the one particular position;

FIG. 4 is an enlarged top view of the apparatus illustrated in FIG. 1;

FIG. 5 is a longitudinal section through the apparatus shown in FIG. 1 taken substantially along line 5—5 looking in the direction of the arrows;

FIG. 6 is a sectional view taken substantially along line 6—6 of FIG. 5 looking in the direction of the arrows;

FIG. 7 is a sectional view taken substantially along line 7—7 of FIG. 5 looking in the direction of the arrows;

FIG. 8 is an enlarged sectional view of a portion of the apparatus shown in FIG. 5 and taken substantially along line 8—8 looking in the direction of the arrows;

FIG. 9 is a sectional view taken substantially along line 9—9 of FIG. 5 looking in the direction of the arrows;

FIG. 10 is a sectional view taken substantially along line 10—10 of FIG. 5 looking in the direction of the arrows and on an enlarged scale;

FIG. 11 is an enlarged sectional view taken substantially along line 11—11 of FIG. 5 looking in the direction of the arrows;

FIG. 12 is an enlarged sectional view taken substantially along line 12—12 of FIG. 5 looking in the direction of the arrows;

FIG. 13 is an enlarged exploded perspective view illustrating the interrelationship of certain components of the apparatus;

Figure 14:
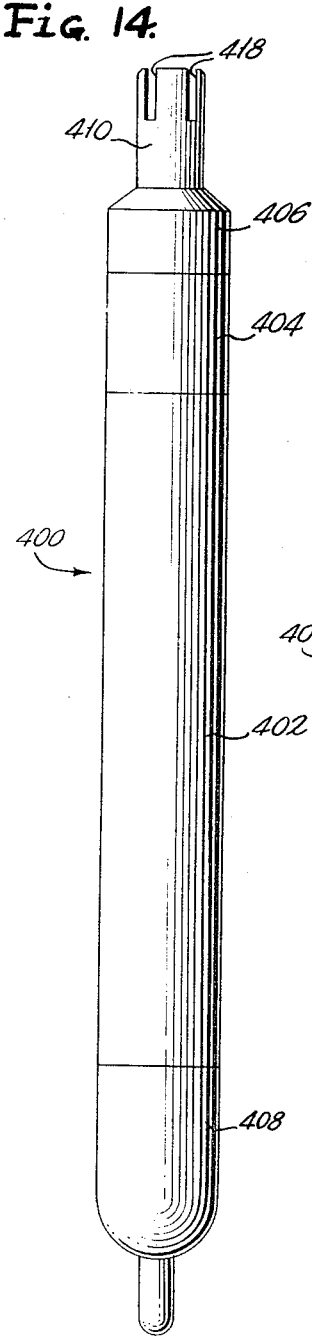
FIG. 14 is an elevation of a modified form of the invention.

Referring now to the drawings wherein like reference characters designate corresponding parts throughout the several views, there is shown in FIGS. 1 through 4 inclusive a bore hole indicated schematically by reference numeral 20 which may be any opening such as the drill hole of an oil well or the like and which may of course comprise the casing which is sometimes disposed in such holes. The inner surface of the bore hole is indicated by reference numeral 22, and the apparatus of the present invention includes a main closed and sealed outer housing indicated generally by reference numeral 24.

The lower end of the main housing 24 is provided with a slot 25 which is adapted to receive a downwardly extending member 26 having a hole formed through the upper portion thereof through which an attaching pin 28 is adapted to fit, this pin being mounted within a threaded opening 30 provided in the lower end of the main housing.

A pair of connecting links 32 of identical construction are pivotally interconnected with the lower end of member 26 as indicated at 34, a pair of similar spring members 36 being operatively associated with the connecting links 32 and member 26 as indicated so as to normally urge the connecting links in such a direction of pivotal movement about the pivotal point 34 as to urge them outwardly toward the inner surface 22 of an associated bore, this construction being conventional and well understood in the art.

A pair of arms 40 are pivotally interconnected with the outer ends of the links as indicated at 42, and each of arms 40 is provided with a plurality of spaced antifriction roller members 44 therealong, these members 44 being adapted to engage the inner surface 22 and to ride therealong so as to facilitate ready movement of the apparatus upwardly and downwardly within the bore as the case may be.

A tubular member 50 is connected to the upper end of the housing as hereinafter more fully described, this tubular member having a closed upper end and having a fitting 52 secured thereto, and to which is connected a lifting and lowering cable 54 which is of generally tubular configuration and through which suitable electrical leads extend.

A pair of connecting links 56 are pivotally interconnected with member 50 as indicated at 58, and a pair of spring members 60 are operatively connected between member 50 and links 56 to normally urge the outer end of the links outwardly toward the inner surface of the bore. As seen most clearly in FIGS. 2 and 4, the links 56 are pivotally interconnected with a bifurcated upper end portion of member 50, and a pair of link members 56 extends oppositely from the upper bifurcated end portion. The pairs of links 56 at either side of this upper end portion are interconnected by a cross member 62 the purpose of which will be more fully hereinafter described.

Arms 64 are pivotally interconnected with the outer ends of links 56 as indicated by reference numeral 65, and a plurality of spaced antifriction roller members 66 are spaced along each of arms 64, these antifriction roller members being adapted to engage the inner surface of the associated bore.

It is apparent that the apparatus of the present invention is provided with automatic centering means in the form of the links and their associated arms and their antifriction rollers, the arms and rollers being normally urged outwardly into engagement with the walls of the bore such that the main housing portion 24 is centered within the bore. Additionally, the construction of the links and arms is such that it is designed to pass over any fault or obstruction in the bore wall, and accordingly, ready movement of the apparatus upwardly and downwardly within the bore regardless of any small bumps or obstructions in the bore wall is facilitated.

Referring now particularly to FIG. 3 of the drawings, a substantially U-shaped holding bracket 70 is illustrated as being mounted in operative position, the opposite parallel arm portions of the bracket being fitted over the cross member 62 previously described so as to hold the links 56 in the operative position shown whereby the arms 64 are held inwardly. It is apparent that with this arrangement, the holding bracket 70 is adapted to hold the arms in a retracted position such that the links and arms can be stored in this condition when the apparatus is not in use. It will be understood that the holding bracket 70 is removed when the apparatus is inserted into a suitable bore. It will further be noted that a similar holding bracket is adapted to be operatively associated with the links 32 at the opposite end of the apparatus, cross members 32' being provided for the purpose of receiving a similar holding bracket for holding the arms 40 inwardly.

Referring now particularly to FIGS. 5 through 13 inclusive, the outer housing 24 includes a generally cylindrical central portion 72 which receives a casting 74 in the upper end thereof and which is secured to the casting 74 by means of screws 76. A casting 78 is disposed within the lower portion of member 72 and secured thereto by means of screws 80.

As seen particularly in FIG. 5, the upper casting 74 is provided with a central counterbored hole 82 having a shoulder therein which supports a thrust bearing 84 the purpose of which will hereinafter be described. The upper portion of the counterbored holes 82 is threaded and receives the lower threaded end portion 86 of member 50, member 50 being operatively retained in position by means of a lock nut 88 threaded on the lower portion 86 of member 50.

A small electrical cable 90 extends downwardly within the central bore portion of member 50 and is secured to a bus bar means 92 which is fixed to the inner surface of member 50 by means of screws 94. A plurality of wiping contact members 96 extend laterally outwardly from bus bar 92 and are adapted to engage slip ring contact means hereinafter described.

An inner casing is indicated generally by reference numeral 100 and includes a main substantially cylindrical body portion 102 having a first casting 104 fixed to the upper end thereof and a second casting 106 fixed to the lower end thereof. The two castings may be supported in operative position by any suitable means. The upper casting 104 is provided with a central threaded opening formed therethrough which is adapted to threadedly receive the lower threaded end of a supporting member indicated generally by reference numeral 112, a lock nut 114 being threaded on the lowermost end portion of member 112 for operatively securing the parts together.

As seen in FIGS. 5 and 6, the upper portion of member 112 is provided with an annular groove 120 which is adapted to receive a substantially U-shaped supporting clip or lock washer member which fits within this annular groove and which is adapted to rest upon the thrust bearing 84 and thereby support member 112 for rotation relative to the supporting structure. It will also be observed as seen in FIG. 6 that member 112 is of tubular construction, and a central electrical cable member 124 extends downwardly therethrough for connection with certain of the electrical components within the apparatus. The electrical cable 124 is connected at its upper end with a plurality of slip ring members 126 mounted on the outer surface of the upper end portion of member 112 and which are adapted to engage the wiping contacts 96 previously described. In this manner, an electrical interconnection is provided from the surface downwardly through the cable 90 fitting within the tubular portion 50 and thence through the wiping contacts 96 to the slip ring contacts 126 and downwardly through the cable portion 124.

As seen particularly in FIG. 5, a thrust bearing 130 is adapted to engage the undersurface of casting 74 and is held in operative position by a pair of lock nuts 132 and 134 threaded on the lower threaded end of member 112.

A bracket member 140 is fixed to the inner surface of the portion 72 of the outer housing and supports a reversible D.C. electric motor 142. This motor is provided with a pair of leads 144 which are adapted to be connected through a passage 145 provided in casting 74 with a pair of electrical leads 146 connected with suitable portions of the slip ring contacts 126 previously described.

The drive motor 142 includes a downwardly extending drive shaft 150 which is fixed to a pinion gear 152. Gear 152 in turn engages a gear 154 secured by means of screws 156 to the casting 104 disposed at the upper end of the inner casing 100. It is apparent that the drive motor is geared to the inner casing such that operation of the drive motor will rotate the inner casing with respect to the outer housing.

Referring now particularly to FIGS. 8 and 12, it will be noted that the casting 106 secured to the lower end of the inner casing is of generaly annular configuration, and is closed by a disc-like member 160 which is held in place by a pair of diametrically oppositely disposed screws 162 which are threaded into openings provided in opposite sides of the disc-like member 160, the screws extending through suitable counterbored openings provided in the wall of member 160.

Member 160 is provided with a central opening therethrough as indicated by reference numeral 164, this opening defining a portion of a spherical surface as will be most apparent from an inspection of FIG. 8. Three spaced radialy extending holes 172 are provided through member 160 and are substantially equally spaced from one another. Each of these holes is threaded and receives a set screw 170 which is adapted to engage a ball bearing member 174 at the inner end of the holes. These balls 174 are adapted to rotatably support a substantially spherical shaped member 180 having a pair of diametrically oppositely disposed threaded holes 182 and 184 as seen in FIG. 13. This spherical member is adapted to fit down within the central recess 164 and member 160 and rest upon the balls 174 for universal rolling movement with respect to member 160.

As seen particularly in FIG. 8, a rod 186 has the opposite ends thereof threaded, the upper end thereof being threaded within the threaded opening 182 provided in spherical member 180, the lower end of rod 186 being threaded into a suitable opening provided in a heavy pendulum weight member 188 which is adapted to swing in a universal manner with respect to the lower end of the casing dependent on the position of the apparatus with respect to a true vertical position.

The spherical member 180 is retained in operative position and prevented from moving upwardly with respect to member 160 by means of a disc-like member 190 which is held in operative position as illustrated in FIG. 5 by means of a pair of screws 192 which extend downwardly through a pair of openings 194 provided in member 190 as seen in FIG. 13 and into threaded holes 196 formed in member 160.

Member 190 is provided with a central recess or hole extending therethrough which defines a portion of a spherical surface complementary with the opening 164 formed in member 160. Member 190 is also provided with three radially extending threaded openings 202 each of which receives an adjusting screw 204 which is threaded therewithin and which engages a ball bearing 206 adapted to engage the upper outer surface of the spherical member 180 to retain it in operative position and to support it for substantially uniform and free movement with respect to the lower end of the inner casing.

As seen particularly in FIG. 12, the outer surface of casting 106 is provided with three substantially equally spaced recesses 210 within which are disposed ball bearing members 212. These ball bearing members are also adapted to engage the inner surface of the outer housing portion 72 so as to properly space the inner casing with respect to the outer housing and to support it for free rotation with respect thereto, it being apparent that members 212 provide an antifriction spacer means.

A plate 220 is supported at the upper portion of casting 106 and has a central opening 220′ formed therewithin. A slip ring 222 is supported on plate 220 and is provided with a central opening 222′. A movable means is indicated generally by reference numeral 224 and comprises a generally U-shaped slide member including a vertically extending portion 226 and a pair of horizontally extending arms 228 and 230.

A connector member is indicated generally by reference numeral 232 in FIG. 8 and includes a depending cup-shaped portion 234 adapted to receive a ball-like upper end 236 of a rod 238 the lower end of which is threaded and threadedly engaged within the hole 184 and the spherical member 180. The connector member 232 also includes an upwardly extending threaded portion 240 which is threadedly disposed within a threaded opening provided in the undersurface of a projection 242 provided on the leg portion 228 of the movable means 224.

A spring urged contact plunger or movable contact means includes a cup-shaped housing portion 250 which fits over the upwardly extending projection 242 previously described. A compression spring 252 is disposed within portion 250 and is adapted to engage the undersurface of a contact end portion 254 which includes an intermediate substantially cylindrical portion extending through a correspondingly shaped opening in the end wall of member 250 and which terminates in a sharp upper contact point.

A bracket 260 as seen in FIG. 5 is fixed to the inner casing portion 102, and a support plate 262 extends laterally from bracket member 260 and is secured thereto by means of screws 262′. A fixed contact means or disc-like plate 264 is secured to the undersurface of member 262, and as particularly seen in FIG. 11, the undersurface of the fixed contact means 264 includes a plurality of radially extending electrically conductive portions 266 which may for example be in the form of fine wires which are electrically insulated from one another throughout the major portions thereof and which may be interconnected at the central area of the plate 264. The sharpened contact end of member 254 is adapted to engage individual ones of the conductors 266 so as to complete a circuit through the movable contact portion 250 and the fixed contact portion 264 in conjunction with a pair of electrical leads 268 and 270 secured to the fixed and movable contact members 264 and 250 respectively. These electrical leads are adapted to be passed upwardly within the apparatus and through the slip ring contact means with the cable 90 which can extend back to the surface. The movable contact means including members 250 and 254, as well as the fixed contact means 264 comprises a direction indicating means the operation of which will be hereinafter described.

Referring now particularly to FIGS. 5 and 10, a movable contact means or plate 274 is fixed to the upper surface of the arm 230 of the movable means 224. Contact means 274 includes a plurality of electrically conductive portions 276 which are substantially concentric with one another and spaced and insulated from one another so as to provide a plurality of concentric contacts.

As seen most clearly in FIG. 5, a bracket member 280 is fixed to the inner surface of the portion 102 of the inner casing and a support plate 282 is fixed to the bracket by a pair of spaced screws 280′ extending through suitable aligned openings provided in these members. Plate 282 includes a downwardly extending projection 284 about which is disposed the open end of a cup-shaped member 286 slidably mounted with respect to the projection. A compression spring 288 is disposed within the cup-shaped member 286 and is adapted to urge a contact portion 290 downwardly. Contact portion 290 terminates in a sharpened outer end portion which is adapted to engage various ones of the concentric contacts 276 previously described.

A pair of electrical leads 294 and 296 are connected respectively with the fixed contact means including members 286 and 290 and with the movable contact plate or means 274. These electrical leads 294 and 296 extend upwardly through the electrical interconnection previously described to the surface and are connected in a suitable electrical circuit for providing an indication of the amount of deviation of the device from vertical as hereinafter described.

A substantially cylindrical member 298 is suitably secured to the inner surface of the portion 102 of the inner casing, and a disc-like member 300 is secured in the lower end of member 298. Member 300 is provided with a central opening which receives the lower threaded end of a member 302, a pair of lock nuts 304 and 306 being threaded on the lower portion of member 302 to retain it in operative position.

A compass plate or reference direction means is indicated generally by reference numeral 310 and is supported on the enlarged upper end portion 312 of member 302. This compass plate 310 is mounted for free rotation about the upper enlarged portion 312 of member 302, the compass plate being suitably magnetized so that it will remain in a constant relationship with respect to magnetic north. In other words, plate means 310 is magetized so that it will always maintain a particular portion of the plate pointing toward magnetic north as determined by the magnetic field of the earth, thereby providing a constant reference as to direction.

Referring particularly to FIG. 9, the flat plate-like portion of compass plate 310 is provided with an elongated slot indicated generally by reference numeral 320 which is disposed substantially concentrically with respect to the center of the plate and which tapers from its largest dimension 322 at one end thereof to its smallest dimension at the opposite end 324 thereof. It will accordingly be apparent that the slot 320 constantly tapers and changes its size from one end to the other end thereof. This construction enables the plate 310 to operate as a shutter to control the amount of light flowing between two components as hereinafter described.

As seen particularly in FIG. 5, the source of light is indicated generally by reference numeral 330 and may comprise a conventional light bulb, one side of the light bulb being connected to ground at plate 300, and the other side of the light bulb being connected through a lead 332 with a photosensitive tube 334. It will be noted that the photosensitive tube is positioned so as to receive light from the bulb as indicated by the arrow L in FIG. 5, and that any light passing from the bulb to the photosensitive tube must pass through the opening provided by slot 320 in the plate 310. It is accordingly apparent that plate 310 will serve as a shutter means to control the amount of light flowing from the source of light 330 to the photosensitive tube 334.

The output of the photosensitive tube 334 is in turn connected with a three-stage amplifier as represented by the three transistors indicated schematically by reference numerals 336, 338 and 340. A plurality of resistors 342, 344, 346, 348 and 350 are connected in this more or less conventional amplifier circuit. A pair of leads 352 and 354 in turn are connected to the minus and plus sources of electrical energy which may be provided either from the surface or from the battery hereinafter described.

A conventional storage battery 360 is supported within the upper portion of member 298, and is provided with a pair of output contacts 362 and 364. Contact 362 is connected through a mercury switch 366 with the electrical circuit previously described, while contact 364 is connected through a suitable lead with the metallic member 298.

In operation, the apparatus may be transported in the position shown in FIG. 3, the apparatus being readily transported due to its compact arrangement and also being easily handled by a single man. When the site has been reached, the holding bracket means 70 may be removed and the centering devices may be allowed to move into contact with the inner walls of a suitable bore as indicated in FIGS. 1 and 2. The device may then be lowered into the well by the cable means 54 through any suitable lifting and lowering mechanisms such as a winch or the like.

As the apparatus is lowered into the bore hole, the depth to which the device is lowered can be readily measured by simply measuring the amount of cable that it let out during the lowering operation. Also, as mentioned previously, infrared means may be utilized for determining the character and type of the gas or liquid within the bore hole and also a densitometer may be employed for measuring the density of the fluid to determine the depth of the fluid in the bore hole.

The automatic centering means will maintain the main outer housing in the central area of the bore hole, and as pointed out previously, the centering means enables the apparatus to readily ride over any obstructions or irregularities in the inner wall of the bore.

When the apparatus reaches a portion of the bore which is disposed at an angle with respect to true vertical, the pendulum means 188 will swing as governed by the force of gravity into a position other than that shown in FIGS. 5 and 8. As the pendulum swings into such a position, the movable means 224 will move carrying the movable contact means 250, 254 and plate 274 along therewith.

As the sharpened contact portion 254 moves with respect to the plate 264, it will engage different ones of the contacts 266 to thereby indicate a different direction. This electrical circuit is so set up that contact between member 254 and different ones of contact portions 266 will indicate to a viewer on a suitable instrument the direction and amount of deviation of the device from either north, south, east or west as the reference direction may be. This amount of deviation will be indicated in suitable increments as desired, and may indicate minutes as well as degrees of direction.

Movement of the movable contact plate 274 with respect to the fixed contact means 290 will result in contact means 290 engaging different ones of the concentric contact portions 276. This in turn will provide different readings on a suitable instrument connected in circuit with these contacts so as to indicate in degrees and minutes the number of degrees or amount of deviation of the pendulum from true vertical.

During the entire operation, a direction control means including the drive motor 142 and the electrical control circuit is continuously operating. As mentioned previously, the compass plate means 310 will maintain a constant reference position due to its magnetic attraction to the earth's magnetic north. If the outer casing should rotate with respect to the desired reference position, and if there are any movements of the inner casing so as to move the inner casing from its desired reference position, the amount of light passing from the source 330 to the photosensitive cell 332 will be varied due to the differing size of the slot 320 as the plate 310 may rotate with respect to the source which is carried by the inner casing.

It is accordingly apparent that the slot 320 is adapted to meter the amount of light passing from the source to the photosensitive tube. The electrical control circuit is so adjusted that variations of this nature are adapted to energize a circuit which in turn is connected with the drive motor 142 so as to move the inner casing to such a position as to stabilize the circuit and to retain its original position.

In other words, the control circuit is so set that the inner casing provides the desired position thereof with respect to a given reference direction, and any variations of the position of the casing from this desired position will result in variations in the amount of light passing to the photosensitive tube which will energize the control circuit so as to operate motor 142 in either of two directions, so as to cause rotation of the inner casing with respect to the outer housing so as to maintain the desired reference position.

It is apparent that continuous readings will be provided at all times of the various characteristics of the bore hole, and the device will automatically maintain its desired relationship.

The closed inner casing of the apparatus may also be filled with a suitable gas if desired for controlling the temperature within the inner casing.

Figure 15:
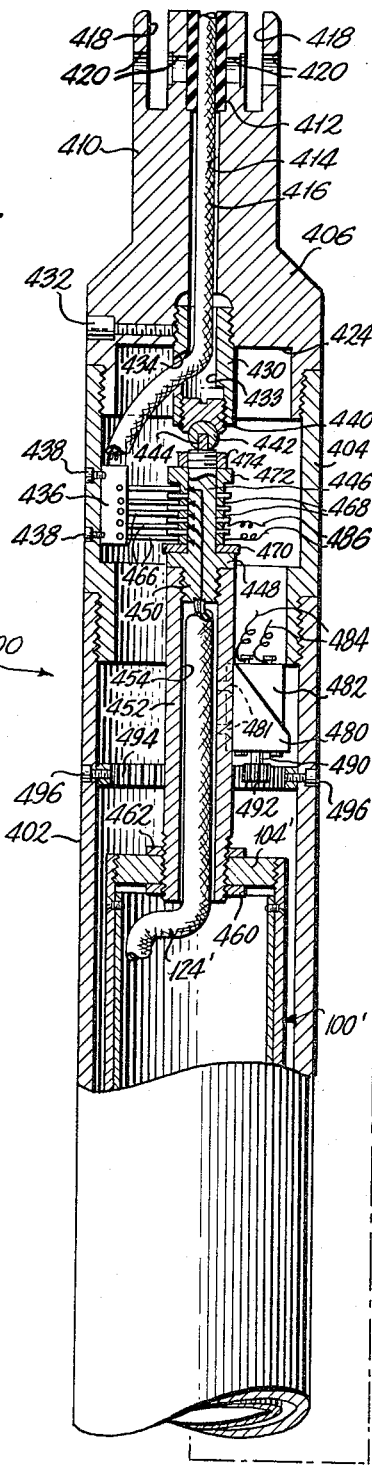
FIG. 15 is a divided view shown in two separate portions and being broken away at the upper and lower ends of the apparatus to illustrate certain details thereof.

Referring now to FIGS. 14 and 15 of the drawings, a modification of the present invention is illustrated. In this modification, the outer housing and the means for rotatably supporting the inner casing therewithin are of different constructions, whereas the structure within the inner casing is substantially the same as that previously described.

In this modification, the closed and sealed outer housing is indicated generally by reference numeral 400. This outer housing includes a generally cylindrical center portion 402 which as seen most clearly in FIG. 15 is threaded onto the lower threaded end of a further generally cylindrical portion 404 which in turn is threaded on the lower threaded end portion of a casting 406. A further casting 408 is threaded into the lower threaded end of the central portion 402.

The casting 406 includes an upwardly extending portion 410 having a longitudinal bore at the upper end thereof which is adapted to receive the lifting and lowering cable 412 which is suitably fixedly secured within this bore. A further bore 414 is aligned with the bore portion which receives cable 412 and an electrical cable 416 extends downwardly through bore 414 for connection with the electrical components hereinafter described.

The upper end of portion 410 of casting 406 is also provided with spaced slots 418 and suitable holes 420 for mounting a centering mechanism therewithin if so desired.

The undersurface of casting 406 is provided with a generally cup-shaped cutout portion 424, and the upper surface of this cutout portion is provided with a threaded hole in communication with the lower end of the bore 414 previously described. The upper threaded end of a tubular member 430 is threaded within this hole, and a set screw 432 extends through a radially extending threaded opening for engaging tubular member 430 to hold it in operative position. Member 430 has a bore 433 formed longitudinally therethrough, and a hole 434 is in communication with this bore and permits the cable 416 to extend downwardly within member 430 and thence laterally through hole 434 for connection with a bus bar 436 secured to the inner surface of the cylindrical portion 404 by means of screws 438 or the like.

A bearing member or portion 440 is provided, this member being generally cylindrical and being provided with threads on the outer surface thereof which are adapted to cooperate with internal threads provided in member 430 whereby the bearing portion 440 may be mounted in the operative position illustrated. This bearing portion includes a bearing surface formed in the undersurface thereof defining a portion of a sphere for cooperating with a generally spherical bearing portion 442 which has a threaded hole therein and is threaded upon the reduced upper end 444 of a member 446. Member 446 includes an intermediate annular flange portion 448 and a lower end portion 450 which is provided with external threads and which is threaded into internal threads formed at the upper end of the tubular member 452 having a bore 454 formed longitudinally therethrough. The lower end of tubular member 452 is threaded through a suitably threaded central hole provided in the casting 104' which corresponds with the casting 104 previously described and which is mounted at the upper end of the inner casing. A pair of lock nuts 460 and 462 are threaded on the lower end of tubular member 452 and serve to hold this tubular member rigidly in fixed relationship to the upper end of the inner casing indicated generally by reference numeral 100' and which corresponds with the inner casing 100 previously described.

It should be understood at this point that the construction of the inner casing and the components therewithin is substantially identical with that previously described, and accordingly it is not necessary to repeat the details of construction of the inner casing.

A plurality of wiping contact members 466 extend laterally inwardly from bus bar means 436 and are adapted to engage slip ring contact means 468 mounted about member 446 and being held in place between annular members 470 and 472, a lock nut 474 being provided on the threaded upper end of member 446 for holding the slip ring assembly in the operative position illustrated.

An electrical cable 124' which corresponds to the cable 124 previously described is connected at the upper end thereof to the slip ring contact means 468 in a conventional manner, member 446 being provided with suitable passages therewithin for receiving the electrical leads as required.

A bracket member 480 is secured to tubular member 452 by screws 481, the bracket member suporting a reversible D.C. electric motor 482. This motor is provided with a pair of leads 484 which are adapted to be connected with a pair of electrical leads 486 connected with suitable portions of the slip ring contacts 468.

The drive motor includes a downwardly extending drive shaft 490 having a pinion gear 492 secured to the lower end thereof. This pinion gear is adapted to mesh with an internal ring gear 494 secured to the inner surface of portion 402 of the outer housing by means of screws 496. It is apparent that actuation of the drive motor will cause the tubular member 452 and the inner casing secured thereto to rotate with respect to the outer housing.

Referring now to the lowermost portion of the housing as shown in FIG. 15, the casting 106 as previously described has been modified as illustrated by reference numeral 106' so that the casting extends downwardly to form an arcuate lower portion whereby the pendulum member 188 previously described will be contained within the casting 106'. This will enable the pendulum to operate in the intended manner, and the portion 106' includes an integral downwardly extending portion 500 which is threaded into a generally spherical bearing member 502. This spherical bearing member is adapted to fit within a suitable recess provided in the upper surface of a bearing portion 504, this recess having a configuration defining a portion of a sphere complementary to sphere 502 whereby a universal bearing is provided at the lower end of the inner casing as well as at the upper end thereof through the intermediary of the two spherical bearing portions 502 and 442. The lower portion 506 of a bearing portion 504 is of reduced dimension and is threaded into a corresponding threaded hole provided in the upper end of casting 408.

A bumper member 510 includes a rounded lower end portion 512 and an annular flange portion 514 extending radially outwardly from the upper end thereof and having spaced metering passages 516 provided therethrough.

The bumper member is retained in operative position by means of a nut 518 which is threaded into the lower threaded end of a bore 520 provided in casting 408. Nut 518 is provided with a central bore which slidably receives the bumper member 510, and a plurality of O-ring sealing members 522 are mounted within suitable annular grooves provided in nut member 518 to provide a fluid-tight seal with bumper member 510.

A member 530 is provided of generally U-shaped cross sectional configuration and fits snugly within the bore 520. Member 530 is provided with metering passages 532 which are aligned with the passages 516 previously described.

Member 530 is retained in the operative position shown by a screw 534 having metering passages 536 formed in the enlarged head portion of the screw and aligned with the passages 516 and 532 previously described. The lower threaded end portion 540 of screw 534 is threaded within a correspondingly threaded bore provided within the bumper member 510 whereby the entire assembly of the bumper member, the U-shaped member and the screw are retained in the position shown.

A compression spring 544 is disposed between the upper surface of screw 534 and the top of the bore 520 whereby spring 544 normally urges the bumper downwardly into its projected position as shown. It is evident that the bumper member is adapted to engage a solid object such as the bottom of a bore hole and to move inwardly against the resilient force of spring 544, while the metering passages will serve to control the rate of movement and to damp out any tendency of the bumper mechanism to oscillate. This bumper mechanism will serve to take up any shock as the apparatus is being lowered into a bore hole should it come into contact with some solid surface.

It is apparent from the foregoing that there is provided according to the present invention new and novel deviation and direction gauge means which is particularly adapted for use in the bore holes of oil wells and the like. The apparatus of the present invention is adapted to accurately measure the deviation angle from vertical of a bore hole and the like, and further to indicate the direction in which the bore extends as related to a fixed reference direction. Automatic centering means is provided which enables the apparatus to remain centered in the bore and to easily pass over obstructions and irregularities. The apparatus can be readily installed, removed and operated by a single man, and is quite simple, compact and inexpensive in construction, yet efficient and reliable in operation. In the modified form of the invention, the inner casing is effectively supported within the outer housing by a pair of longitudinally spaced bearing portions which enable the inner casing to readily rotate with respect to the outer housing while maintaining the inner casing in proper aligned spaced relationship within the outer housing, and further while providing an arrangement wherein the friction is reduced to a minimum.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A deviation and direction gauge means comprising an outer housing, an inner casing disposed within said outer housing and movable relative thereto, deviation indicating means disposed within said inner casing and direction indicating means also disposed within said inner casing, only a single pendulum means movably mounted within said housing and operatively interconnected with both said deviation indicating means and said direction indicating means, and means for automatically controlling the relative directional position of said inner casing at all times to maintain a substantially constant reference direction thereof, means for centering said outer housing substantially centrally within an associated bore within which the housing is disposed, a drive motor mounted within said outer housing and secured thereto, said inner casing being drivingly interconnected with said drive motor, said means for automatically controlling the position of said inner casing comprising a control circuit for controlling the operation of said drive motor, said control circuit including magnetic means adapted to maintain a substantially constant magnetic heading, said pendulum means being swingably supported for substantially universal movement, said direction indicating means including a first resiliently urged contact means and movable with said pendulum means, a first flat plate-like contact means movable with said pendulum means, a second plate-like contact means adapted to engage said first resiliently urged contact means and being connected in an electrical circuit to provide an indication of the direction of orientation of the pendulum means with respect to a reference direction, said deviation indicating means including a second resiliently urged contact means fixed to said inner casing and engaging said first plate-like contact means and connected in an electrical circuit to cooperate therewith to provide an indication of the amount of deviation of the pendulum means with respect to its normal position when the apparatus is disposed in a true vertical position.

2. Apparatus as defined in claim 1 wherein said centering means includes a plurality of connecting links pivotally interconnected with said housing, arms pivotally interconnected with said links, said arms having antifriction means thereon for riding along the inner surface of an associated bore, and resilient means normally urging said arms and said antifriction means outwardly into engagement with the inner surface of the walls of an associated bore.

3. Apparatus as defined in claim 1 wherein said control circuit for said drive motor includes a source of light, photosensitive means for receiving illumination from said source of light, and a shutter means for controlling the amount of illumination passing from said source of light to said photosensitive means, said shutter means being operatively connected with said magnetic means, and means within said inner casing for providing a source of electrical energy to said control circuit.

4. Apparatus as defined in claim 1 wherein said first plate-like contact means of said deviation indicating means comprises a plurality of substantially concentrically arranged conductive portions which are insulated from one another.

5. Apparatus as defined in claim 1 wherein said second plate-like contact means of said direction indicating means includes a plurality of elongated conductive contact portions which are insulated from one another throughout the major portion of their length and which are angularly spaced from one another.

6. Apparatus as defined in claim 1 wherein said pendulum means includes a freely movable weight means, a support portion, and means for supporting said support portion in an antifriction manner to permit free swinging of the pendulum means.

7. Apparatus as defined in claim 1 wherein said inner casing is a closed sealed unit and is filled with a gas for controlling the temperature within the inner casing.

8. A deviation and direction gauge means comprising an outer housing, an inner casing disposed within said outer housing and movable relative thereto, deviation indicating means disposed within said inner casing and direction indicating means also disposed within said inner casing, only a single pendulum means movably mounted within said housing and operatively interconnected with both said deviation indicating means and said direction indicating means, and means for automatically controlling the relative directional position of said inner casing at all times to maintain a substantially constant reference direction thereof, said means for controlling the position of said inner casing including a drive motor disposed within said outer housing, said drive motor being drivingly connected between said outer housing and said inner casing for rotating said inner casing with respect to said outer housing, an electrical control circuit for controlling the operation of said drive motor to maintain the inner casing in a substantially constant reference direction relationship, said electrical control circuit including magnetic means adapted to maintain a substantially constant magnetic heading, said pendulum means being swingably supported adjacent one end portion of said inner casing and being mounted for substantially universal movement, movable means operatively connected with said pendulum means, said movable means including a first pair of contact means movable with said movable means, a second pair of contact means cooperating with said first pair of contact means and being fixed with respect to said inner casing, said pairs of contacts including two resiliently urged contact means and two plate-like contact means, each resiliently urged contact means engaging one of said plate-like contact means, two interengaging contact means being connected in an electrical circuit to provide an indication of the direction of orientation of the pendulum means with respect to a reference direction, the other two interengaging contact means being connected in an electrical circuit to cooperate therewith to provide an indication of the amount of deviation of the pendulum means with respect to its normal position when the apparatus is disposed in a true vertical position.

9. Apparatus as defined in claim 8 including a pair of spaced bearing portions mounted in said outer housing, said inner casing including a pair of bearing portions interconnected therewith and engaging said first-mentioned pair of bearing portions for rotatably supporting the inner casing within said outer housing, and resilient bumper means supported at the lower end of said outer housing.

References Cited by the Examiner
UNITED STATES PATENTS

| | | | |
|---|---|---|---|
| 2,415,221 | 2/1947 | Savitz | 33—205.5 |
| 2,806,295 | 9/1957 | Ball | 33—205.5 |

LEONARD FORMAN, *Primary Examiner.*

W. K. QUARLES, *Assistant Examiner.*